United States Patent
Pettit et al.

(10) Patent No.: US 9,894,188 B2
(45) Date of Patent: Feb. 13, 2018

(54) PACKET DATA RESTORATION FOR FLOW-BASED FORWARDING ELEMENT

(71) Applicant: Nicira, Inc., Palo Alto, CA (US)

(72) Inventors: Justin Pettit, Los Altos Hills, CA (US); Jarno Rajahalme, Belmont, CA (US)

(73) Assignee: NICIRA, INC., Palo Alto, CA (US)

( * ) Notice: Subject to any disclaimer, the term of this patent is extended or adjusted under 35 U.S.C. 154(b) by 202 days.

(21) Appl. No.: 14/839,866

(22) Filed: Aug. 28, 2015

(65) Prior Publication Data

US 2017/0064048 A1    Mar. 2, 2017

(51) Int. Cl.
| | |
|---|---|
| *H04L 12/26* | (2006.01) |
| *H04L 29/06* | (2006.01) |
| *H04L 12/741* | (2013.01) |
| *H04L 12/723* | (2013.01) |
| *H04L 12/747* | (2013.01) |

(52) U.S. Cl.
CPC ............ *H04L 69/22* (2013.01); *H04L 45/50* (2013.01); *H04L 45/742* (2013.01); *H04L 45/745* (2013.01)

(58) Field of Classification Search
CPC .......... H04L 41/00; H04L 45/54; H04L 69/22
See application file for complete search history.

(56) References Cited

U.S. PATENT DOCUMENTS

| | | | |
|---|---|---|---|
| 8,966,035 B2 | 2/2015 | Casado et al. | |
| 9,407,580 B2 | 8/2016 | Ganichev et al. | |
| 9,455,901 B2 | 9/2016 | Davie et al. | |
| 2004/0196827 A1* | 10/2004 | Xu | H04L 41/00 |
| | | | 370/352 |
| 2005/0223095 A1 | 10/2005 | Volz et al. | |
| 2011/0087774 A1 | 4/2011 | Pope et al. | |
| 2011/0103259 A1 | 5/2011 | Aybay et al. | |
| 2013/0044641 A1 | 2/2013 | Koponen et al. | |
| 2015/0010000 A1 | 1/2015 | Zhang et al. | |
| 2015/0103679 A1 | 4/2015 | Tessmer et al. | |
| 2015/0124608 A1 | 5/2015 | Agarwal et al. | |
| 2015/0281098 A1 | 10/2015 | Pettit et al. | |
| 2015/0358288 A1 | 12/2015 | Jain et al. | |
| 2015/0358290 A1 | 12/2015 | Jain et al. | |

* cited by examiner

*Primary Examiner* — Kevin C Harper
(74) *Attorney, Agent, or Firm* — Adeli LLP

(57) ABSTRACT

Some embodiments provide a method for preserving temporary storage values of a packet processed by a managed forwarding element (MFE. While processing a packet at the MFE, the method identifies that the packet is to be recirculated as a new packet for the MFE. A set of packet field values used for processing the packet by the MFE are associated with the packet. The method stores the set of packet field values with an identifier value. The method recirculates the packet with the identifier value attached to the packet. Upon receiving the recirculated packet, the method uses the identifier value to restore the set of packet field values for the recirculated packet.

20 Claims, 14 Drawing Sheets

Connection Table 500

| Source IP Address 501 | Source Port 502 | Destination IP Address 503 | Destination Port 504 | Protocol ID 505 |
|---|---|---|---|---|
| Src_IP_Add_1 | Src_Port_1 | Dest_IP_Add_1 | Dest_Port_1 | Protocol_1 |
| Src_IP_Add_2 | Src_Port_5 | Dest_IP_Add_2 | Dest_Port_1 | Protocol_1 |
| Src_IP_Add_3 | Src_Port_1 | Dest_IP_Add_1 | Dest_Port_2 | Protocol_1 |
| Src_IP_Add_2 | Src_Port_3 | Dest_IP_Add_8 | Dest_Port_3 | Protocol_1 |
| | | | | |

5-tuple information for the established connections 510

5-tuple information for a new connection 515

*Fig. 5*

| Match Criteria | Action |
|---|---|
| ingress_port = port_a, TCP, connection status = not tracked | conntrack(recirculate, ...) |
| ingress_port = port_a, TCP, connection state = established | output port = port_b, ... |
| ingress_port = port_a, TCP, connection state = new | drop |
| ingress_port = port_a, TCP, connection state = reply | output port = port_b, ... |
| ... | ... |

Fig. 7

PACKET DATA RESTORATION FOR FLOW-BASED FORWARDING ELEMENT

BACKGROUND

A flow-based software switch uses flow tables to forward, redirect, or drop packets. Each flow table entry has a match criteria and an action. When a packet matches the criteria in a flow table entry, a set of instructions included in the corresponding action are applied to the packet. The flow entries used in flow-based software switches are stateless. The flow entry rules are written based on only the fields and metadata of the packet that is currently being processed.

However, to implement a firewall, some firewall rules require knowledge of connection state. For instance, a firewall rule may allow a virtual machine to initiate connections to the Internet and those connections are allowed to send response packets in the network. However, connections that are initiated from the Internet are not allowed.

One option that has been tried is to create a new flow entry in the reverse direction for each established connection. However, creating these new flow entries for every connection can cause severe performance problems. Another technique that has been attempted is to enforce firewall rules based on transmission control protocol (TCP) flags. Firewall policies are enforced on packets that have SYN flag set, i.e., the packets that are flagged as the initial packet of a session. The packets that have ACK (acknowledge) or RST (reset the connection) flags are set are allowed. This technique is fast, however, it allows non-established flows to go through when ACK or RST flags are set. In addition, the technique is only applicable to TCP packets.

BRIEF SUMMARY

Some embodiments provide a connection tracking module within the virtualization software in which a flow-based managed forwarding element (MFE) operates (e.g., in the kernel and/or user space), for use by the flow-based MFE. A flow-based MFE operates by matching incoming packets with one or more flow entries. Each flow entry includes a set of matching criteria (or condition) and a set of actions. The matching criteria specify a subset of the packet header values for which it requires a match. When a packet matches the set of matching criteria of a flow entry, the action or actions specified by the corresponding set of actions are performed on the packet.

Flow entries in a flow-based software MFE of some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refers to the packet connection status. As a result, the packet is sent to a connection tracker outside the forwarding element to determine the packet's connection status. The connection of each packet is identified by an n-tuple in the packet header in some embodiments. For instance, the n-tuple that identifies a transport layer connection may use the standard 5-tuple of the source Internet protocol (IP) address, the source (transport layer) port number, the destination IP address, the destination port number, and the identification of the transport layer protocol used by the packet. The connection tracker saves the n-tuple value of each new connection.

When the connection tracker receives a new packet from the MFE, the connection tracker (i) adds the packet's n-tuple to a list of ongoing connections if the packet is new, (ii) tags the packet with a connection status (e.g., as belonging to a new connection, established connection, a connection related to another existing connection, a reply to an existing connection, etc.) and (iii) sends the packet back to the MFE with data (e.g., one or more bits, a tag, etc.) identifying this connection status. The MFE utilizes flow entries that match over this connection information, allowing for stateless flows to match over stateful information.

During the processing of a packet, metadata and register information is created for the packet and is stored in temporary storage. However, if a packet is sent to the connection tracker (or anywhere outside the MFE, such as for Multi-Protocol Label Switching (MPLS) processing), this metadata and register information is lost. Reestablishing this metadata and register information can be expensive, in terms of computation time and resources. Therefore, for packets that are sent to the connection tracking module, the metadata and register information is stored in a cache, and restored when the packet returns with its additional connection bits information. To perform this restoration, some embodiments assign the packet an identifier when sending the packet to the connection tracking module, and store the current state of the packet (e.g., its headers and metadata, including the current processing stage). When the packet is received back from the connection tracking module, the identifier can then be used to restore this packet state and continue processing, without having to re-perform many of the same packet processing operations on the packet.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 5 conceptually illustrates a connection table of some embodiments of the invention.

FIG. 7 illustrates an example of a set of stateful firewall rules that are written based on the stateless flows.

DETAILED DESCRIPTION OF THE INVENTION

Figure 1:
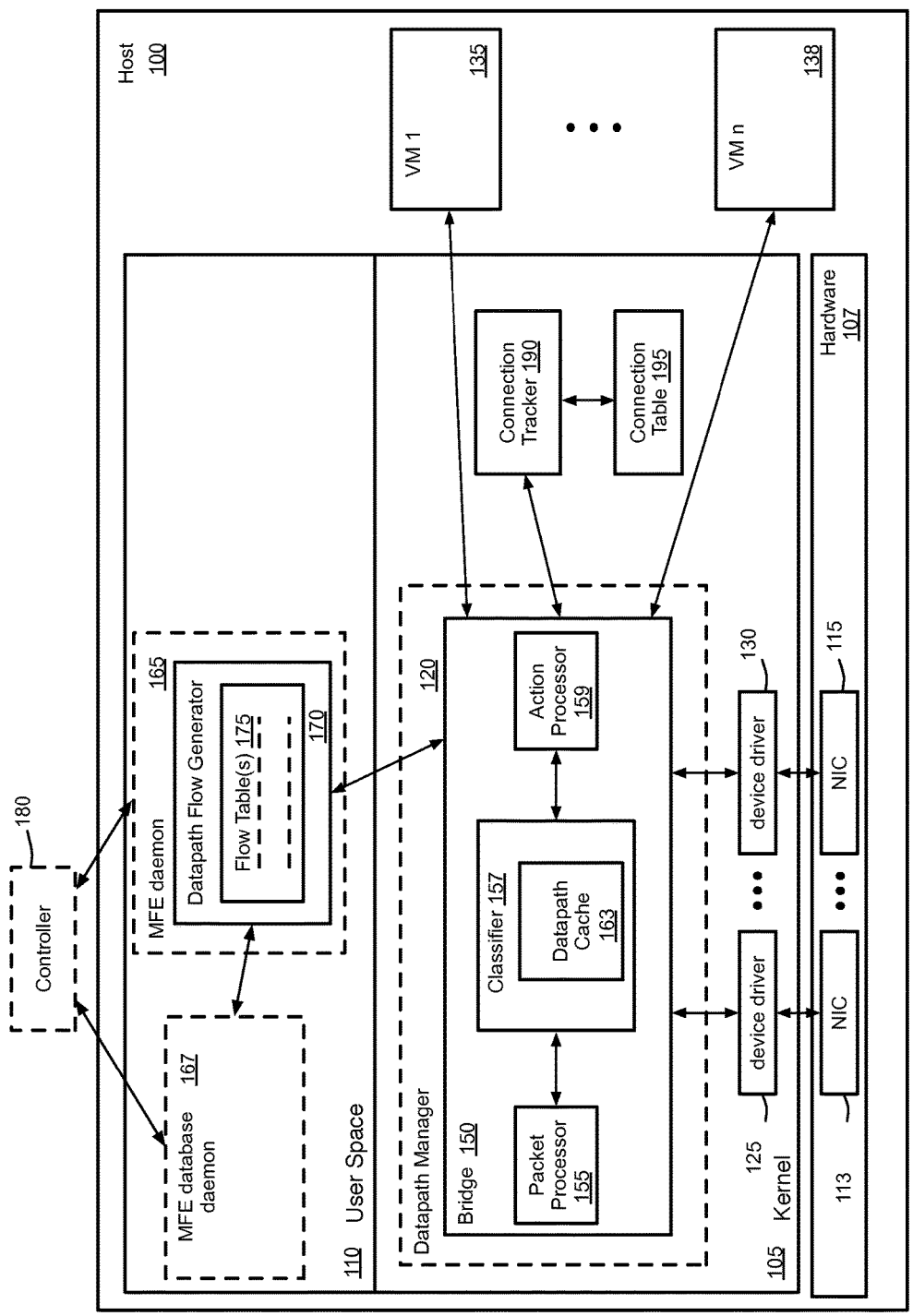
FIG. 1 conceptually illustrates an architectural diagram of a host machine on which a software-implemented MFE and a connection tracker of some embodiments are implemented.

In the following detailed description of the invention, numerous details, examples, and embodiments of the invention are set forth and described. However, it should be understood that the invention is not limited to the embodiments set forth and that the invention may be practiced without some of the specific details and examples discussed. Some embodiments provide a connection tracking module within the virtualization software in which a flow-based managed forwarding element (MFE) operates (e.g., in the kernel and/or user space), for use by the flow-based MFE. A flow-based MFE operates by matching incoming packets with one or more flow entries. Each flow entry includes a set of matching criteria (or condition) and a set of actions. The matching criteria specify a subset of the packet header values for which it requires a match. When a packet matches the set of matching criteria of a flow entry, the action or actions specified by the corresponding set of actions are performed on the packet.

Flow entries in a flow-based software MFE of some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refers to the packet connection status. As a result, the packet is sent to a connection tracker outside the forwarding element to determine the packet's connection status. The connection of each packet is identified by an n-tuple in the packet header in some embodiments. For instance, the n-tuple that identifies a transport layer connection may use the standard 5-tuple of the source Internet protocol (IP) address, the source (transport layer) port number, the destination IP address, the destination port number, and the identification of the transport layer protocol used by the packet. The connection tracker saves the n-tuple value of each new connection.

When the connection tracker receives a new packet from the MFE, the connection tracker (i) adds the packet's n-tuple to a list of ongoing connections if the packet is new, (ii) tags the packet with a connection status (e.g., as belonging to a new connection, established connection, a connection related to another existing connection, a reply to an existing connection, etc.) and (iii) sends the packet back to the MFE with data (e.g., one or more bits, a tag, etc.) identifying this connection status. The MFE utilizes flow entries that match over this connection information, allowing for stateless flows to match over stateful information.

During the processing of a packet, metadata and register information is created for the packet and is stored in temporary storage. However, if a packet is sent to the connection tracker (or anywhere outside the MFE, such as for Multi-Protocol Label Switching (MPLS) processing), this metadata and register information is lost. Reestablishing this metadata and register information can be expensive, in terms of computation time and resources. Therefore, for packets that are sent to the connection tracking module, the metadata and register information is stored in a cache, and restored when the packet returns with its additional connection bits information. To perform this restoration, some embodiments assign the packet an identifier when sending the packet to the connection tracking module, and store the current state of the packet (e.g., its headers and metadata, including the current processing stage). When the packet is received back from the connection tracking module, the identifier can then be used to restore this packet state and continue processing, without having to re-perform many of the same packet processing operations on the packet.

I. Connection Tracking Module

In some embodiments, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, MFEs operate on host machines that host virtual machines or other data compute nodes that serve as the sources and destinations for packets (e.g., in the virtualization software of such a host machine). For example, an MFE might operate on a host machine that hosts virtual machines for several different logical networks, and would implement the several logical networks for each of the virtual machines residing on the host. The MFE in some embodiments is configured and managed by a network controller.

FIG. 1 conceptually illustrates an architectural diagram of a host machine 100 on which a software-implemented MFE and a connection tracker of some embodiments are implemented. In some embodiments, the MFE is implemented in the virtualization software (e.g., in the hypervisor) of the host 100. In this example, the MFE includes several components, including a datapath manager 120 as well as an MFE daemon 165 and MFE database daemon 167. In some embodiments, the datapath manager 120 operates in a kernel 105 of the virtualization software while the MFE daemon 165 and the MFE database daemon 167 both operate in the user space 110 of the virtualization software.

As shown in FIG. 1, the host 100 includes hardware 107 (although the figure shows a software architecture diagram, the hardware 107 is displayed in order to represent the network interface cards (NICs) 113 and 115 of the host machine), virtualization software kernel 105, virtualization software user space 110, and several VMs 135-138. The MFE is a first-hop forwarding element for the VMs 135-138. The hardware 107 may include typical computer hardware (e.g., processing units), volatile memory (e.g., RAM), non-volatile memory (e.g., hard disk, optical disks, solid-state memory, etc.), network adapters, etc. As shown, the hardware 107 also includes NICs 113 and 115 for connecting a computing device to a network.

The virtualization software that includes the kernel 105 and user space 110 is a software abstraction layer that operates on top of the hardware 107 and below any operating system in some embodiments. In some embodiments, the kernel 105 performs virtualization functionalities (e.g., to virtualize the hardware 107 for several virtual machines operating on the host machine). The kernel 105 handles various management tasks, such as memory management, processor scheduling, or any other operations for controlling the execution of the VMs 135-138 operating on the host machine.

As shown, the virtualization software includes device drivers 125 and 130 for the NICs 113 and 115, respectively. The device drivers 125 and 130 allow an operating system to interact with the hardware of the host 100. The VMs 135-138 are independent virtual machines operating on the host 100, and may run any number of different operating systems (e.g., Linux, Solaris, FreeBSD, or any other type of UNIX based operating system, Windows-based operating systems, etc.). While this figure shows an example in which the MFE operates within the virtualization software of the host and the VMs 135-138 operate on top of that virtualization software, it should be understood that the disclosed embodiments are equally applicable when the MFE is not part of any virtualization software (e.g., in non-virtualized environments). In some such embodiments, no virtualization software is present on the host machine, and thus VMs are not present (instead, packets may simply be forwarded between NICs).

The user space 110 of the virtualization software includes the MFE daemon 165 and the MFE database daemon 167. The MFE daemon 165 is an application that runs in the background of the user space 110. The MFE daemon 165 of some embodiments receives configuration data from the network controller 180 (which may be a chassis controller operating on the host, or a network controller operating on a separate physical machine to manage several host machines) and the MFE database daemon 167. For instance, from the controller, the MFE daemon 165 of some embodiments receives generated flow entries that specify packet processing operations to apply to packets when the packets match a set of conditions. The MFE daemon 165 stores the received flow entries in the flow tables 175. In some embodiments, the flow tables are organized in stages (e.g., stages of packet processing), with one or more stages for each of several logical forwarding elements. For instance, a logical switch might have an ingress mapping stage, an ingress access control list (ACL) stage, a logical forwarding stage, an egress ACL stage, etc.). For an MFE implementing multiple logical networks, each of the logical networks has several stages of flow tables in some embodiments.

In some embodiments, the MFE daemon 165 communicates with the network controller 180 using the OpenFlow Protocol, while the MFE database daemon 167 communicates with the network controller 180 through a database communication protocol (e.g., OVSDB protocol). The database protocol of some embodiments is a JavaScript Object Notation (JSON) remote procedure call (RPC) based protocol.

The MFE database daemon 167 is also an application that runs in the background of the user space 110 in some embodiments. The MFE database daemon 167 in some embodiments communicates with the network controller 180 in order to configure certain aspects of the MFE (e.g., of the MFE daemon 165 and/or the datapath manager 120) other than the installation of flow entries. For instance, the MFE database daemon 167 receives management information from the network controller 180 for configuring bridges, ingress ports, egress ports, QoS configurations for ports, etc., and stores the information in a set of databases that help define the configuration of the MFE.

As illustrated in FIG. 1, the kernel 105 includes the datapath manager 120. Datapath manager processes and forwards network data (e.g., packets) between VMs running on the host 100 and network hosts external to the host (e.g., network data received through the NICs 113 and 115). In some embodiments, the VMs 135-138 running on the host 100 couple to the datapath manager through a bridge 150.

In some embodiments, the bridge 150 manages a set of rules (e.g., flow entries) that specify operations for processing and forwarding packets. The bridge 150 communicates with the MFE daemon 165 in order to process and forward packets that the bridge 150 receives. In the example of FIG. 1, bridge 150 includes a packet processor 155, a classifier 157, and an action processor 159. The packet processor 155 receives a packet and parses the packet to strip header values. The packet processor 155 performs a number of different operations. For instance, in some embodiments, the packet processor 155 is a network stack that is associated with various network layers to differently process different types of data that it receives. Irrespective of all the different operations that it can perform, the packet processor 155 passes the header values to the classifier 157. In some embodiments, the packet processor stores these header values in one or more registers that are stored for a packet. In some embodiments, the packet processor 155 defines an object for the packet that includes the registers. The packet object is then used to represent the packet in the MFE.

The classifier 157 accesses one or more datapath caches 163 (also referred to as a flow cache) to find matching flow entries for different packets. For instance, in some embodiments, the classifier includes a flow aggregate cache that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 163 specifies an action for the action processor 159 to perform on packets that match the flow entries. These datapath cache flow entries are installed by the classifier 157, in some embodiments, based on processing of a packet through the set of flow tables 175 by the MFE daemon 165.

The classifier 157 also, or alternatively, includes an exact-match cache in some embodiments. The exact-match cache of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and either an action or a reference to one of the flow entries in the traffic aggregate cache. As such, multiple different exact-match entries might refer to the same cached flow entry (e.g., for similar data flows for the packets of which the forwarding element will perform the same action).

When the classifier 157 receives the header values for a packet, it first performs a check with the exact-match cache to determine whether the packet belongs to a data flow that already has an entry in the cache. If a match is found in the exact-match cache, the classifier sends the packet to the action processor 159 with the action specified by the matched entry. When the packet does not belong to a data flow for which the exact-match cache already stores an entry, the classifier 157 performs a lookup on the aggregate flow cache to find a matching flow entry. When a matching flow entry is found in the aggregate flow cache, the classifier stores a new exact-match cache entry, which can be used for subsequent packets that belong to the same data flow.

In certain cases, no matching flow entries can be found in the datapath cache (e.g., for the first packet of a data flow that does not share enough characteristics with other data flows). In these cases, the MFE shifts control of the packet processing to the MFE Daemon 165 for a full set of packet processing operations (i.e., executing of numerous lookup stages over the flow tables 175, possibly including conjunctive match lookups).

Figure 2:
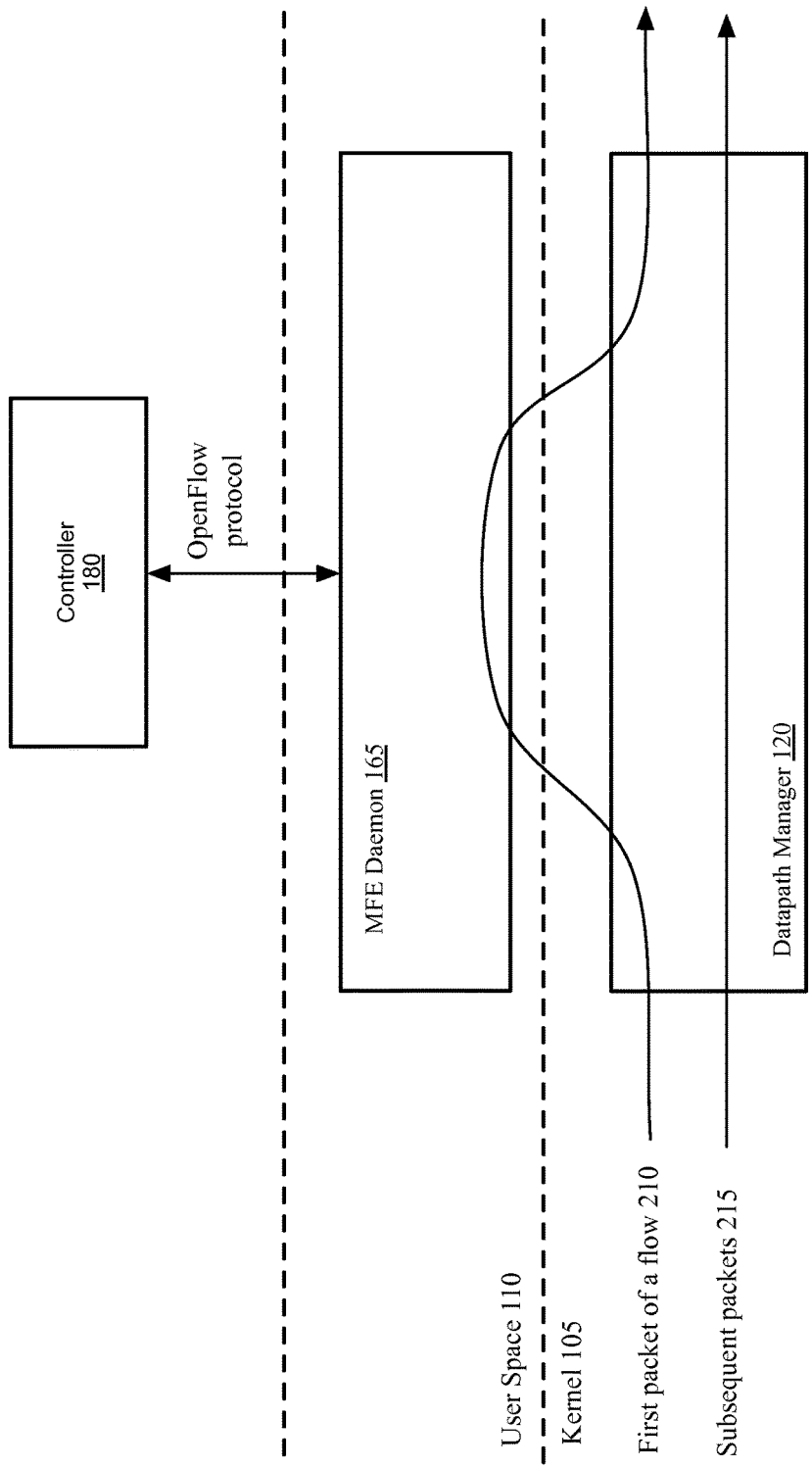
FIG. 2 conceptually illustrates two different paths that a packet may take through an MFE in some embodiments.

FIG. 2 conceptually illustrates two different paths that a packet may take through an MFE in some embodiments. The datapath manager 120 receives the packets first. For example, the datapath manager receives the packets from a physical NIC 113-115 (shown in FIG. 1) or a VM's virtual NIC (not shown). If a matching entry is found in the datapath cache, the datapath manager follows the instructions (or actions) given by the flow entry to process the packet. Otherwise, when no match is found, the packet is sent to the MFE daemon 165 in the user space 110. MFE daemon 165 determines how the packet should be handled, and passes the packet back to the datapath manager 120 in kernel 105 with the desired handling. Sending the packets (such as packet 210) back and forth between the datapath manager in kernel and the MFE daemon in kernel is time consuming and it is desirable to do processing of as many packets (such as packets 215) by the datapath manager in kernel as possible.

One primary distinction between the cache 163 and the set of flow tables 175 is that there is at most only one matching flow entry for a packet in the cache 163. The cached flow entries specify all of the actions to take in order to process the packet, whereas each of the flow entries in the tables 175 only specify the actions for that stage, often specifying a resubmit action for processing by the next packet processing stage. After completing the processing for a packet, the classifier 157 sends the packet to the action processor 159. The action processor 159 performs the set of actions specified for the packet.

The MFE daemon 165 of some embodiments includes a datapath flow generator 170. The datapath flow generator 170 is a component of the MFE that makes forwarding and other packet processing decisions. For any packet that is not matched in the datapath cache 163 (e.g., because the packet is the first in a new transport-layer connection), the datapath flow generator 170 performs the one or more flow table lookups required to process the packet, and then generates new flow entries to install in the cache 163. In some embodiments, the datapath flow generator includes or works in conjunction with a separate classifier (not shown) in order to find one or more matching flow entries in the flow tables 175. Unlike the classifier 157, the MFE daemon 165 may perform one or more resubmits (i.e., be resubmitted back to the classifier with packet data modified based on actions performed by previous matched flow entries).

It should be understood that the architecture shown in FIG. 1 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

Flow entries in a flow-based software switch are stateless. The flow entry rules are written over only the stateless fields and metadata of the packet that are being processed. However, to implement a firewall, some firewall rules require knowledge of connection state. For instance, a firewall rule may allow a virtual machine to initiate connections to the Internet (or an external network) and those connections are allowed to send response packets in the network. However, connections that are initiated from the Internet are not allowed.

Learn actions have been used in the past to create a new flow entry for each connection in reverse direction. Flows used the learn action and whenever a connection was established to the external network, the learn action would have created a new flow entry in the reverse of the flow entry that was being learned. Once the flow entry for the reverse direction was created, the response packets from the external network were allowed.

However, creating a new flow entry for each connection that is established causes severe performance problems. For instance, as described above by reference to FIG. 2, it is desired to perform as much packet processing in kernel as possible to avoid sending packet information between the datapath in kernel, the MFE daemon in user space (or the controller 180). Updating the flow tables for each new connection would also create overhead.

Some embodiments provide a connection tracker 190 in the kernel 105 of the virtualization software. The datapath manager 120 sends the incoming packets to the connection tracker 190 when packet matches a flow entry specifying such an action. The connection tracker determines a connection status for the packet (e.g., new connection, established connection, reply portion of a connection, a connection related to an established connection, etc.). When a packet is determined to be associated with a new connection, the connection tracker saves a set of packet fields (e.g., an tuple in the header of the packet) in the connection table 195. The same set fields (or n-tuple) in each packet is compared with the saved entries in the connection table to determine whether a packet is associated with an existing or related connection. A related connection, for example, might be a control portion of a control/data communication between two endpoints, such that the ports are different but the network addresses the same.

Once the connection tracker determines the connection status, the connection tracker sets a tag in the packet to specify the connection status. For instance, if only four values are possible (e.g., new, established, reply, and related, then two bits (00, 01, 10, 11) could be used. Other embodiments may use more or fewer values to identify different packet statuses. The connection tracker 190 then returns the packet to the MFE, which recirculates the packet back to the input queue while assigning the packet a new recirculation value (which can be used, as described below, to restore metadata and packet headers for the packet).

It should be noted that, while in this example the datapath and connection tracking module are shown in the kernel, some embodiments implement the entire flow-based MFE in the user space of the virtualization software (e.g., a DPDK-based implementation). In this case, the connection tracking module is also implemented in the user space as well, and similar principles to those described herein apply to both the operation of the connection tracking module and the recirculation mechanism.

In some embodiments, a packet includes a set of bits in a field of the packet header for the connection status. In other embodiments, a set of bits in an unused field of the packet header is used to store the connection status. Yet in other embodiments, a set of fields at the end of the header and before the payload are allocated for options and padding. The header padding is used to ensure that the header ends and data begins on a certain (e.g., 32) bit boundary. In these embodiments, one or more fields in the options and padding area are used to store the packet connection status. For any packets that are received from outside (i.e., not recirculated from the connection tracker to the MFE), in some embodiments, the connection status bits indicate that the connection status is unknown (e.g., all bits are set to 0).

Figure 3:
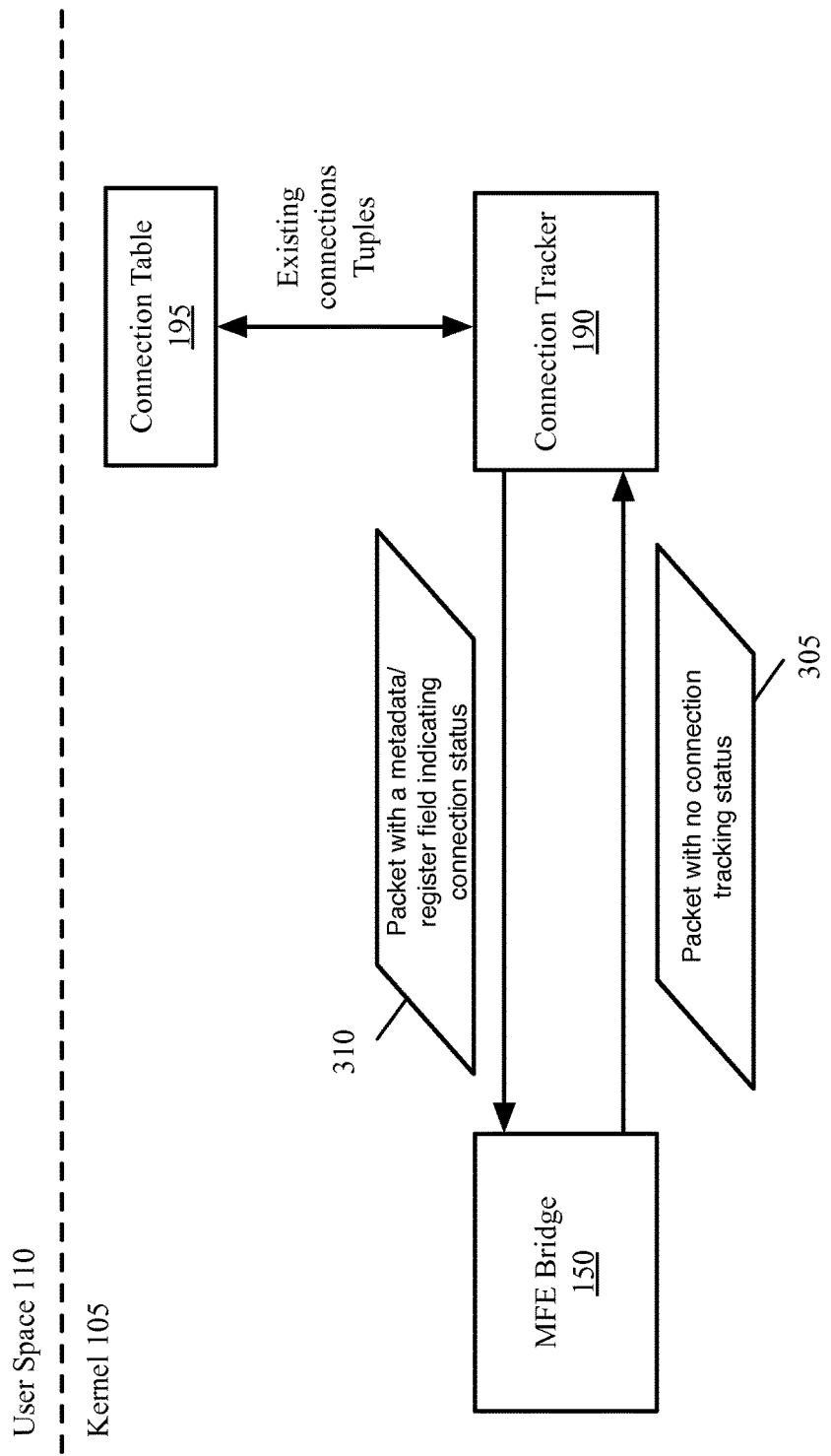
FIG. 3 conceptually illustrates a connection tracker of some embodiments.

FIG. 3 conceptually illustrates a connection tracker of some embodiments. As shown, connection tracker 190 receives a packet 305 from the MFE bridge 150. For instance, the MFE bridge receives a packet from an outside network and determines that one of the flow entries for the packet requires (e.g., as an action) to send the packet to the connection tracker (e.g., in order to determine the connection status and then apply a firewall rule that depends on the stateful connection status). The MFE bridge checks the connection status information to determine this connection status, but as the status has not yet been determined, this status information indicates that the connection status is unknown. Thus, the bridge 150 forwards the packet 305 to the connection tracker 190 to determine the packet's connection status.

Figure 4:
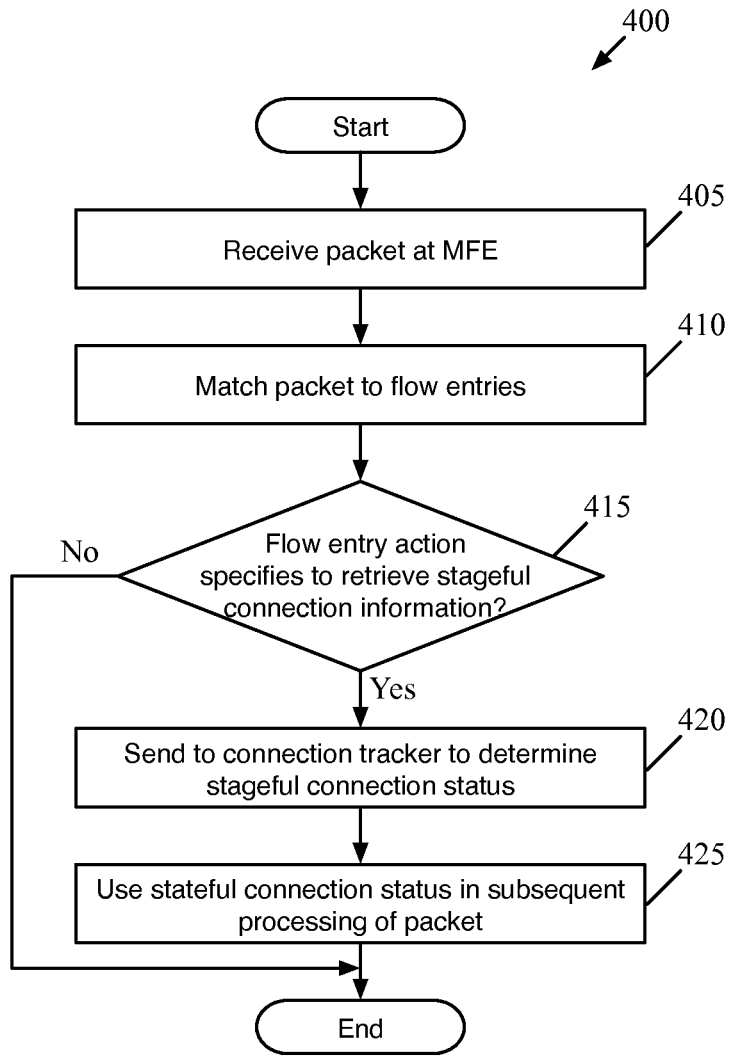
FIG. 4 conceptually illustrates a process of some embodiments performed by an MFE to use a connection tracking module to determine stateful connection information for a packet and then use the stateful connection information in subsequent processing of the packet.

FIG. 4 conceptually illustrates a process 400 of some embodiments performed by an MFE (e.g., the MFE of FIG. 1) to use a connection tracking module to determine stateful connection information for a packet and then use the stateful connection information in subsequent processing of the packet. The process is performed in some embodiments by the bridge 150 of the datapath manager 120, or by the user space MFE daemon 165. It should be understood that this process 400 is conceptual, and is actually only representative of a portion of the operations performed by the MFE when processing a packet. Furthermore, it should be understood that the MFE of some embodiments does not actually make a yes/no determination as to whether each action requires it to send a packet to the connection tracking module, but rather simply sends the packet to the connection tracking module when an action specifies such.

As shown, the process receives (at 405) a packet in the MFE. This could be a packet sent by a local VM or other data compute node, or a packet received from an external source (e.g., directed to a local VM or other data compute node). The process then matches (at 410) the packet to the flow entries in the flow tables of the MFE. In some embodiments, this may involve kernel matches over cached flow entries (e.g., over an exact match cache, an aggregate traffic cache, etc.), or one or more stages of user space flow entry tables. In the latter case, then actions (e.g., to modify the packet header and metadata information) may be performed at each stage, while continuing to perform the packet processing. Once a dispositive action is determined for the packet, the packet and a new flow entry to be applied and cached is sent down to the kernel, where the operations can be performed.

The process then determines (at 415) whether the matched flow entry action (e.g., the single matched entry in the kernel, or one of the entries matched in user space) specifies to retrieve stateful connection information by sending the packet to the connection tracking module. For example, a flow entry might specify to send the packet to the connection tracking module so that stateful connection information can be retrieved, which can then be used as a match condition in subsequent stages to implement a stateful firewall (or other stateful operations that use the connection state) in the stateless MFE.

When none of the matched entries specify to retrieve stateful connection information for the packet, the process 400 ends (though this does entail performing any other required actions, such as outputting the packet to a particular port, dropping the packet, etc.). Otherwise, the process sends (at 420) the packet (e.g., packet 305 in FIG. 3) to the connection tracker to determine the stateful connection status for the packet. The connection tracker performs its operations to identify the connection status and tag the packet with the relevant status information, and returns the packet to the MFE (e.g., for the MFE to recirculate the packet back to the datapath).

The process then uses (at 425) the stateful connection status in subsequent packet processing on the recirculated packet. This enables the MFE to apply stateful firewall rules (e.g., to drop packets for non-established connections that do not meet certain criteria) or to apply other stateful processing that uses the connection status as its state. For instance, this connection status may be used as a match condition for subsequent flow entries that specify whether to drop or allow the packet. It should be understood that other embodiments may use other stateful modules in a similar manner, and use the stateful data as match conditions on other types of stateful flow entries. FIG. 7, described below, illustrates examples of several such flow entries that match on the stateful connection status information.

Referring back to FIG. 3, once connection tracker 190 receives the packet, the connection tracker examines a set of fields in the packet header to determine whether the packet is associated with an established connection. For instance, in some embodiments a set of n fields (an n-tuple) in a packet header uniquely identifies the connection associated with the packet. For instance, the n-tuple may identify a connection (e.g., a transport layer connection such as TCP connection) that is established between the source of the packet and the MFE. Example of such an n-tuple is the 5-tuple in the header of a packet that identifies the source IP address, source port number, destination IP address, destination port number, and the identification of the protocol used by the packet. This 5-tuple in some embodiments uniquely identifies the connection associated with a packet.

For each packet that is sent to the connection tracker 190, the connection tracker checks a set of n-tuples that are stored in the connection table 195. Each n-tuple stored in the connection table identifies a connection that is already established between two endpoints (typically, one of which is a VM or other data compute node that connects directly to the MFE). FIG. 5 conceptually illustrates a connection table 500 of some embodiments of the invention. As shown, the table stores an n-tuple 501-505 for each established connection.

In the example of FIG. 5, the n-tuple is a 5-tuple that includes the source IP address 501, the source port number 502, the destination IP address 503, the destination port 504, and the identification 505 of the protocol used by the packet. If the 5-tuple in the header of a packet matches the 5-tuple 510 of any of the established connections in the table, the connection tracker determines that the packet is associated with an established connection.

If the 5-tuple does not directly match one of the established connections, some embodiments also determine whether the packet is a reply packet for an established connection (e.g., the source IP address and source port of the packet match the destination IP address and destination port of an established connection, and vice versa), or for a connection related to an established connection (e.g., the source and destination IP addresses are the same but the source and/or destination port numbers are different).

Otherwise, the connection tracker determines that the packet is associated with a new connection. The connection tracker also enters the 5-tuple 515 associated with the new connection in the connection table (some embodiments also enter 5-tuples associated with related or reply connections into the connection table as well, so that subsequent packets for those connections will be identified as established connections). All subsequent packets with the same 5-tuple will then match the new entry and the packets will be associated with the corresponding connection.

Figure 6:
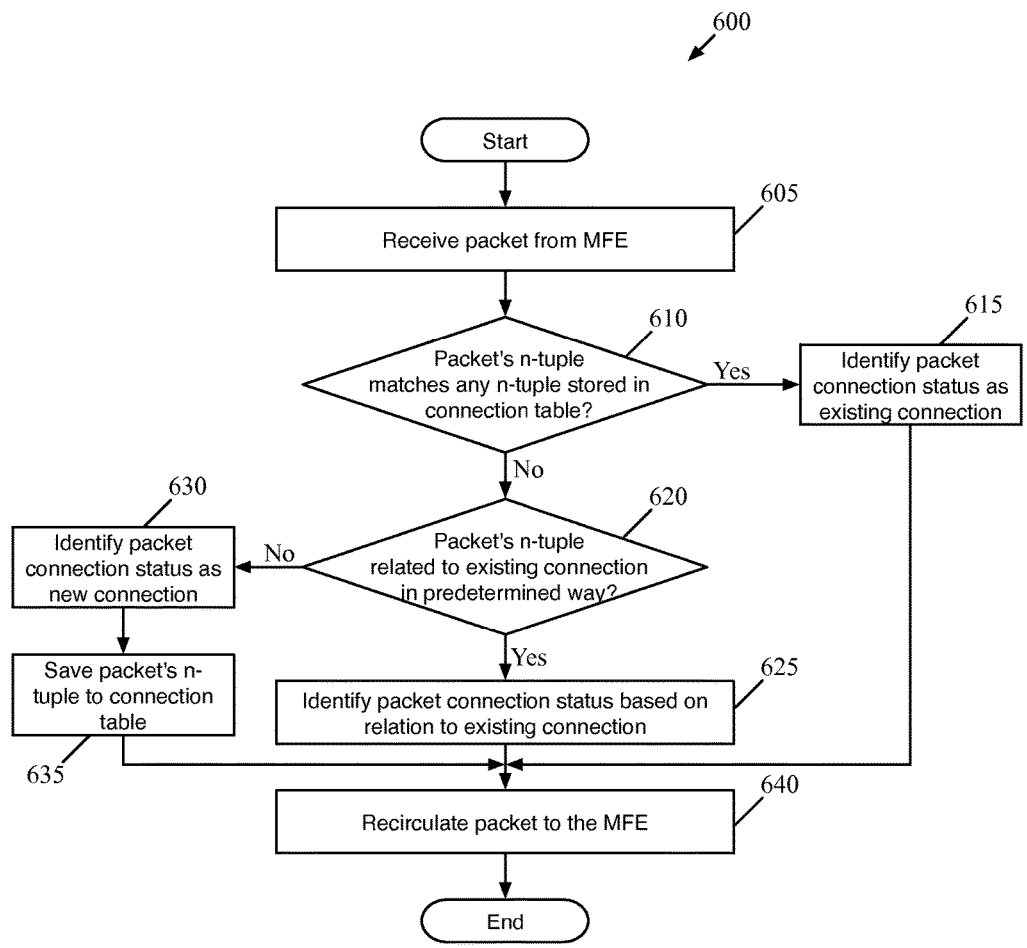
FIG. 6 conceptually illustrates a process 600 of some embodiments for determining the connection status of a packet.

Once a packet's connection status is determined, the connection tracker sets or resets the connection status field of the packet to indicate the stateful connection status for the packet. FIG. 6 conceptually illustrates a process 600 of some embodiments for determining the connection status of a packet. Process 600 is performed by the connection tracking module (e.g., the connection tracker 190) in some embodiments. As shown, the process receives (at 605) a packet from the MFE. As described above by reference to FIG. 1, both the MFE component (e.g., bridge 150) and the connection tracker (190) operate in the kernel of virtualization software of a host machine in some embodiments (though in other embodiments, the MFE and connection tracker may operate in the user space of the virtualization software).

Upon receipt of the packet, the process determines (at 610) whether the packet's n-tuple (e.g., the 5-tuple described by reference to FIG. 5) that identifies connections matches any established connection's n-tuple that is stored in its connection table. The connection tracking module may perform a hash lookup for the n-table in some embodiments by hashing the n-tuple and performing a lookup in a hash table that points to a specific connection in the connection table, then verifying that the referenced n-tuple does in fact match that of the packet. Other embodiments may use other table search techniques to identify whether a match exists in the connection table.

When the packet's n-tuple matches an n-tuple in the connection table, the process identifies (at 615) the packet as belonging to an established connection. For instance, the process sets or resets one or more bits associated with the packet that identify the connection status of the packet, in order to specify the packet's connection status as belonging to an established connection. This may be a simple 2-bit or 3-bit value in some embodiments, or may be a string or numeric value in other embodiments.

When the packet's n-tuple does not directly match an n-tuple in the connection table, the process 600 of some embodiments determines (at 620) whether the packet's n-tuple is related to an existing connection in a pre-determined manner. For example, some embodiments identify a packet that is a reply to an existing connection (e.g., a reverse-direction packet). In this case, for the standard connection 5-tuple, the source address and source port of the packet would match the destination address and destination port of the 5-tuple, while the destination address and destination port of the packet match the source address and source port of the five-tuple). To perform such a check, some embodiments swap the source and destination fields of the packet and perform a hash lookup similar to that described above for the existing connection lookup.

As another example, some embodiments determine whether a 5-tuple shares the same addresses as an existing connection but with different source and/or destination ports. This could be evidence of a related connection, such as a control signal connection that corresponds to an existing data connection (or vice versa). In either case (or in the case any other connection relatedness test is passed), the process identifies (at 625) the packet as belonging to a particular type of connection (e.g., reply, related, etc.). For instance, the process sets or resets one or more bits associated with the packet that identify the connection status of the packet, in order to specify the packet's connection status as belonging to an established connection. This may be a simple 2-bit or 3-bit value in some embodiments, or may be a string or numeric value in other embodiments.

If the packet does not match or relate to an existing connection in any way, the process identifies (at 630) the packet's connection status as belonging to a new connection. As for the other statuses, the process may set one or more bits associated with the packet, set a string or numeric value, etc. The process also saves (at 635) the packet's n-tuple (e.g., the 5-tuple 515 in FIG. 05) in the connection table. In some embodiments, the process also saves the n-tuple for packets that are related or replies to existing connections, so that subsequent packets for those connections will be treated as belonging to existing connections.

The process then recirculates (at 640) the packet to the MFE, and ends. The in-kernel recirculation of the packet of some embodiments places the packet back in the MFE's input queue, this time with the connection status appropriately set or reset to indicate the packet's connection status. In addition, in some embodiments, the MFE assigns a new recirculation identifier to the packet that is used to restore metadata and packet headers for the packet. Once a packet has its stateful connection status appended as a header or metadata field, flow entries that match on this stateful information may be applied to the packet (e.g., stateful firewall rules).

FIG. 7 illustrates an example of a simple set of stateful firewall rules 700 that are written based on the stateless flows. As shown, each firewall rule flow entry (similar to any other flow entry) includes a set of match criteria 710 and a set of action 715. The example of FIG. 7 illustrates a set of firewall rules that requires an unsolicited packet (i.e., a packet received on a new connection) from an external network (such as the Internet) to be dropped. On the other hand, the set of firewall rules allow packets coming from an external network in response to a packet that was previously sent from the MFE or as part of an established connection.

As shown, the match criteria 720 in the first rule requires a packet to be received at ingress port "port_a" over a TCP connection (i.e., a connection from outside the local network). The match criteria 720 also requires that the connection status of packet to be "not tracked." In this example, a packet's connection status is "not tracked" when the packet has never been sent to the connection tracker to determine the packet's connection status. In some embodiments, when all bits in the connection status field of a packet are set to a particular pattern such as all zeros, the packet connection status is "not tracked."

When a packet matches the criteria 720, the corresponding action 725 requires the packet to be sent to the connection tracker for connection determination. In this example, the packet is sent to the connection tracker, and also recirculated back to the MFE input queue. The recirculate action may have other parameters, as described in the subsequent section. The match criteria 720 and the associated action 725, therefore, require a packet (such as packet 305 in FIG. 3) that does not include a connection status to be sent to the connection tracker to determine whether the packet is associated with a new connection or an established connection.

The next match criteria 730 has similar conditions as match criteria 720, except that match criteria 730 requires the packet to be associated with an established connection. The associated action 735 requires the packet to be sent out on port_b of the MFE. The match criteria 750 and its corresponding action 755 are similar, in that reply packets are also sent to the output port port_b of the MFE.

The match criteria 740 has similar conditions as match criteria 720, 730, and 750 except that match criteria 740 requires the packet to be associated with a new connection. The associated action 745 requires that a packet that matches the criteria 740 (i.e., a packet that is sent from outside the network on a new connection) to be dropped. While these are simple examples, many more complex firewall rules or other flow entries may be implemented in the MFE using the stateful connection information.

II. Preserving Data for Recirculated Packets

During the processing of a packet, metadata and register information is created for the packet and is stored in temporary storage. However, if a packet is sent to the connection tracker (or anywhere outside the MFE, such as for Multi-Protocol Label Switching (MPLS) processing), this metadata and register information is lost. Reestablishing this metadata and register information can be expensive, in terms of computation time and resources. Therefore, for packets that are sent to the connection tracking module, the metadata and register information is stored in a cache, and restored when the packet returns with its additional connection bits information. To perform this restoration, some embodiments assign the packet an identifier when sending the packet to the connection tracking module, and store the current state of the packet (e.g., its headers and metadata, including the current processing stage). When the packet is received back from the connection tracking module, the identifier can then be used to restore this packet state and continue processing, without having to re-perform many of the same packet processing operations on the packet.

As described above, the MFE of some embodiments defines an object for the packet that includes header and data fields received in the packet as well as metadata and a set of register bits (used as temporary variable) that are allocated for the packet to facilitate the processing of the packet by the MFE. In some embodiments, such an object with metadata and/or register fields is created only when the packet is sent up to user space for stage packet processing, whereas in the kernel the MFE performs only a single match over a parsed set of packet header fields.

Figure 8:
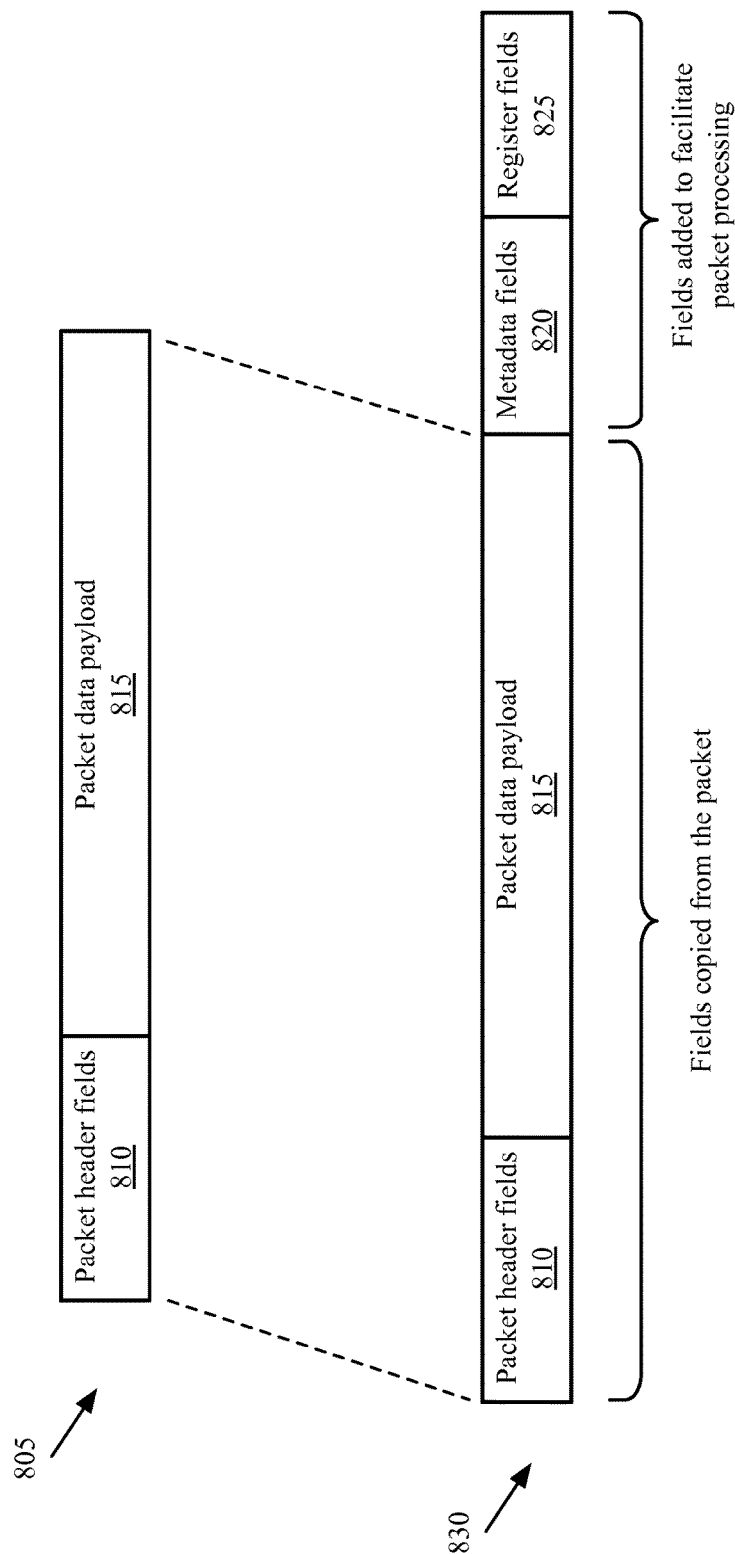
FIG. 8 conceptually illustrates an object created by the MFE for a packet that includes fields received in the packet as well as additional fields added to facilitate packet processing in some embodiments.

FIG. 8 conceptually illustrates an object created by the MFE for a packet that includes fields received in the packet as well as additional fields added to facilitate packet processing in some embodiments. As shown, the packet 805 received at MFE includes several packet header fields 810 as well as a data payload 815. The MFE (e.g., the MFE daemon 165) creates an object 830 for the packet that includes the packet's header fields 810 and payload data 815.

In addition, the created object 830 includes several additional temporary fields for metadata 820 and register fields (or registers) 825. Registers provide the MFE space with temporary storage while a packet is being processed. Packet metadata in some embodiments is used to carry information from one flow table to the next. Metadata fields relate to the origin or processing of a packet, and are not extracted from the packet data itself. For instance, one of the metadata fields is used in some embodiments to identify the MFE ingress port from which the packet is received. In some embodiments, the packet metadata and register fields may be used interchangeably.

In some embodiments, when a packet is sent to the user space for staged packet processing that results in sending the packet out to the connection tracker, a flow entry will be generated for the kernel (e.g., the datapath cache 163) for subsequent packets having the same header fields. However, the packet that is recirculated from the connection tracker will not have the same header fields (because its connection status will be different), and will thus not match that or any other flow entry in the datapath cache. Instead, the packet will be sent back up to the user space again for further processing.

Since the recirculated packet leaves the MFE and is received back as a new packet, the information stored in the metadata and register fields of the packet that were populated in the user space during the processing prior to the packet being sent out for recirculation will be lost. Re-establishing this information can be expensive, both as a matter of populating the fields and in terms of re-performing numerous packet processing stages up to the stage at which the connection status is used. Accordingly, some embodiments store the metadata and register values of any packet that is sent to the connection tracker (or recirculated for other reasons) and restore these values when the packet is recirculated from the connection tracker. Although the following discussions describes saving and restoring the temporary storage values of a packet that is sent out of the MFE to a connection tracker, it should be understood that the invention is applicable to saving and restoring the temporary storage values of packets that are sent to any other entity outside the MFE and recirculated back to the MFE.

Figure 9:
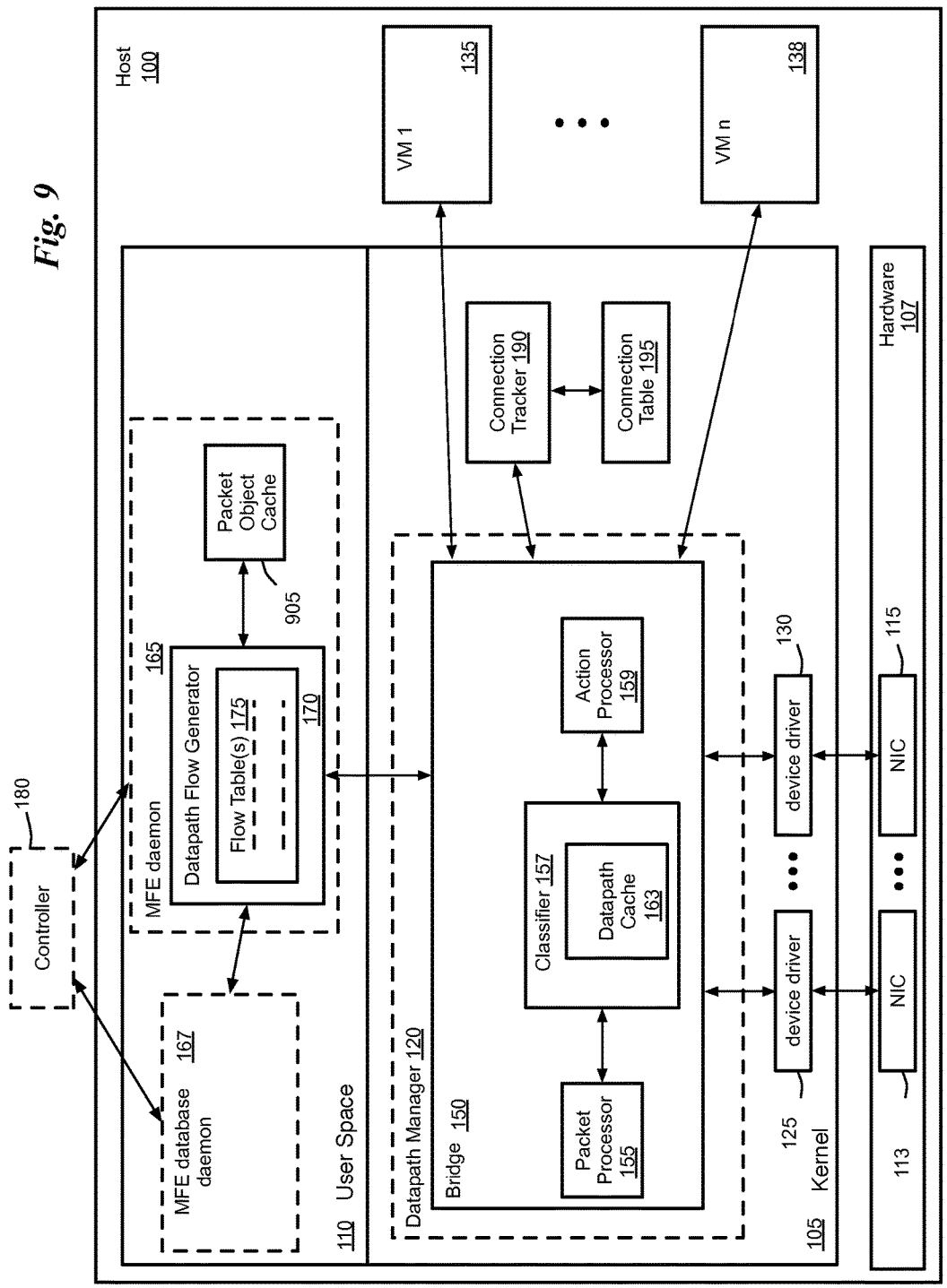
FIG. 9 conceptually illustrates an architectural diagram of a host machine of some embodiments on which a software-implemented MFE with a mechanism to save and restore packet metadata and registers for recirculated packets is implemented.

FIG. 9 conceptually illustrates an architectural diagram of a host machine of some embodiments on which a software-implemented MFE with a mechanism to save and restore packet metadata and registers for recirculated packets is implemented. Many components in FIG. 9 are similar to components in FIG. 1 and are not described again for brevity. As shown in FIG. 9, the connection tracker 190 is not a component of the MFE, and thus any packet sent from the bridge 150 to connection tracker 190 and recirculated back to the MFE will be treated as a new packet.

As described above, when a packet is pushed up to user space for staged packet processing, various metadata and register fields are created for a packet and stored with the packet (e.g., as part of a packet object created by the MFE). When the packet leaves the MFE, these metadata and register fields are typically lost. The loss of metadata and register fields, however, causes problems when a packet sent to connection tracker is recirculated back to the MFE, as (i) the packet may have some important information stored in the metadata and register fields that is not easy to recreate for a recirculated packet (e.g., ingress port) and (ii) it may be costly to recreate the information that can be recreated (e.g., by reproducing multiple stages of packet processing).

As such, some embodiments store the metadata and register values of packets before the packets are sent to the connection tracker or otherwise recirculated. As shown in FIG. 9, the packet objects (e.g., packet object 830 in FIG. 8) are stored in packet object cache 905 in the user space 110. Prior to sending a packet to the connection tracker, the MFE (e.g., the MFE daemon 165 in the user space) stores the packet object in the packet object cache 905. In some embodiments, these packet objects are indexed using, e.g., integer values.

When the connection tracking module modifies the connection status in the recirculated packet (or a packet is otherwise recirculated), the hash of the header fields in the recirculated packet will not match any entries in the kernel hash tables (i.e., the new packet received from the connection tracker results in a cache miss on the flow entries in the datapath cache 163). As a result, the packet is again sent to MFE daemon in the user space for further processing. In some embodiments, when the MFE recirculates a packet (e.g., because the packet is sent to the connection tracking module, or for other reasons such as MPLS processing), the MFE appends a recirculation identifier field to the packet. This recirculation identifier matches the index for the packet object in the packet object cache 905, which the MFE daemon then uses to look up the packet when it is returned to the user space after recirculation.

Figure 10:
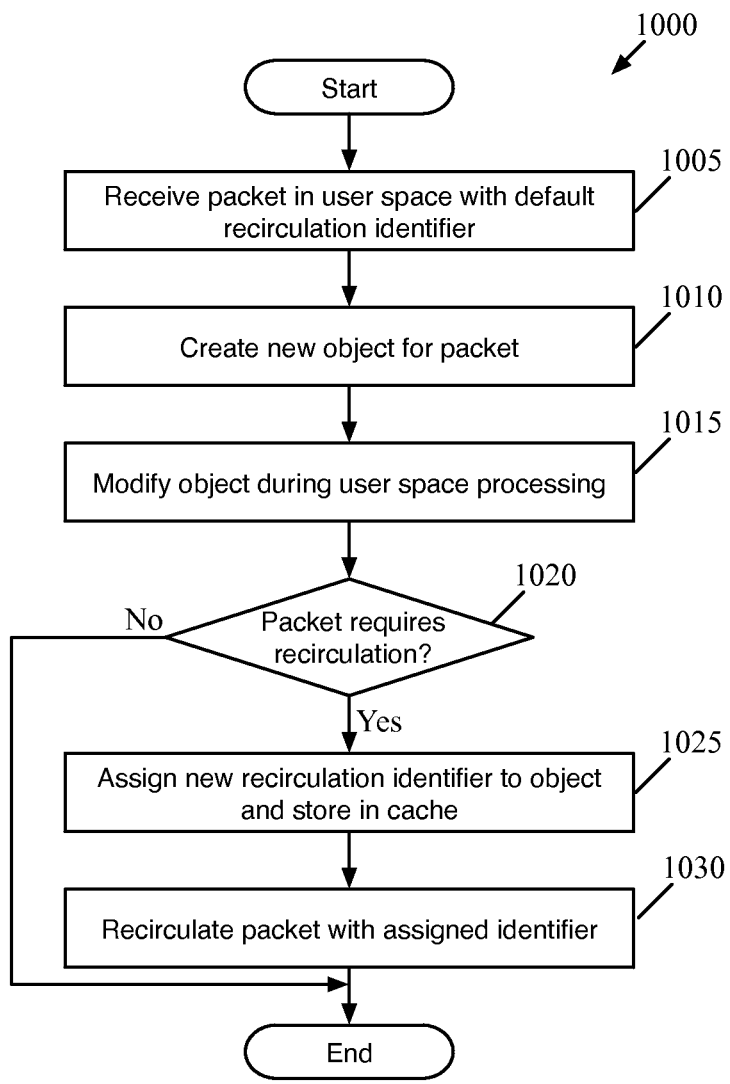
FIG. 10 conceptually illustrates a process of some embodiments for storing metadata and register values of a packet when the packet is recirculated.

FIG. 10 conceptually illustrates a process 1000 of some embodiments for storing metadata and register values of a packet when the packet is recirculated. The process 1000 may be performed by the MFE daemon of some embodiments (i.e., the user space component of an MFE that performs staged packet processing when a packet does not match any entry in the kernel cache of the MFE).

As shown, the process begins by receiving (at 1005) a packet in user space with a default recirculation identifier. In some embodiments, when a packet is received at the MFE through an ingress port (e.g., not via recirculation), the packet will not have a recirculation identifier. For such packets, the MFE of some embodiments automatically assigns the packet a default recirculation identifier (e.g., a value of 0). If the MFE does not find a match for such a packet in its kernel cache (e.g., an exact-match cache), then the MFE pushes the packet up to the user space for processing through the staged forwarding tables. It is at this point that the process 1000 receives the packet with a default identifier.

The process then creates (at 1010) a new object for the packet in the user space. In some embodiments, the packet already exists as an object based on its processing in the kernel, and the object as created in the user space includes various registers and metadata fields that are not part of the packet in the kernel (e.g., a stage register that indicates the current packet processing stage, logical port information, etc.).

Next, the process 1000 modifies (at 1015) the packet object during user space processing. The MFE daemon of some embodiments may process the packet through several stages of the user space processing, during which the metadata and register fields will often be modified. For instance, if the packet is processed through logical switches and/or routers, then the metadata fields may be used to store logical ingress ports, logical egress ports, logical forwarding element identifiers, etc., which are used during the intermediate processing by the MFE daemon.

The process then determines (at 1020) whether the packet requires recirculation. It should be understood that this process is conceptual, and that this determination in some embodiments is simply the result of an action specifying to recirculate the packet. A flow entry in the MFE might recirculate the packet when sending the packet to the connection tracking module, if performing MPLS processing on the packet, or if using another process outside the MFE that appends data (e.g., stateful data) to the packet and returns it to the MFE.

When the packet requires recirculation, the process assigns (at 1025) a recirculation identifier to the packet object and stores the object in the cache. Some embodiments store the entire packet object in the cache, while other embodiments store only specific fields (e.g., all of the metadata and/or register fields of the packet object). The cache, in some embodiments, is indexed according to this recirculation identifier.

As such, the process 1000 recirculates (at 1030) the packet with the assigned identifier. That is, the MFE appends the assigned identifier to the packet as a recirculation identifier, which can then be matched against when the packet is subsequently sent to the MFE kernel. Further, if no match is found in the kernel, the appended recirculation identifier can be used to identify the stored packet object and restore the data from that object in order to resume packet processing in the user space without having to regenerate all of the metadata (e.g., by re-performing all of the packet processing stages that were performed prior to recirculation).

Figure 11:
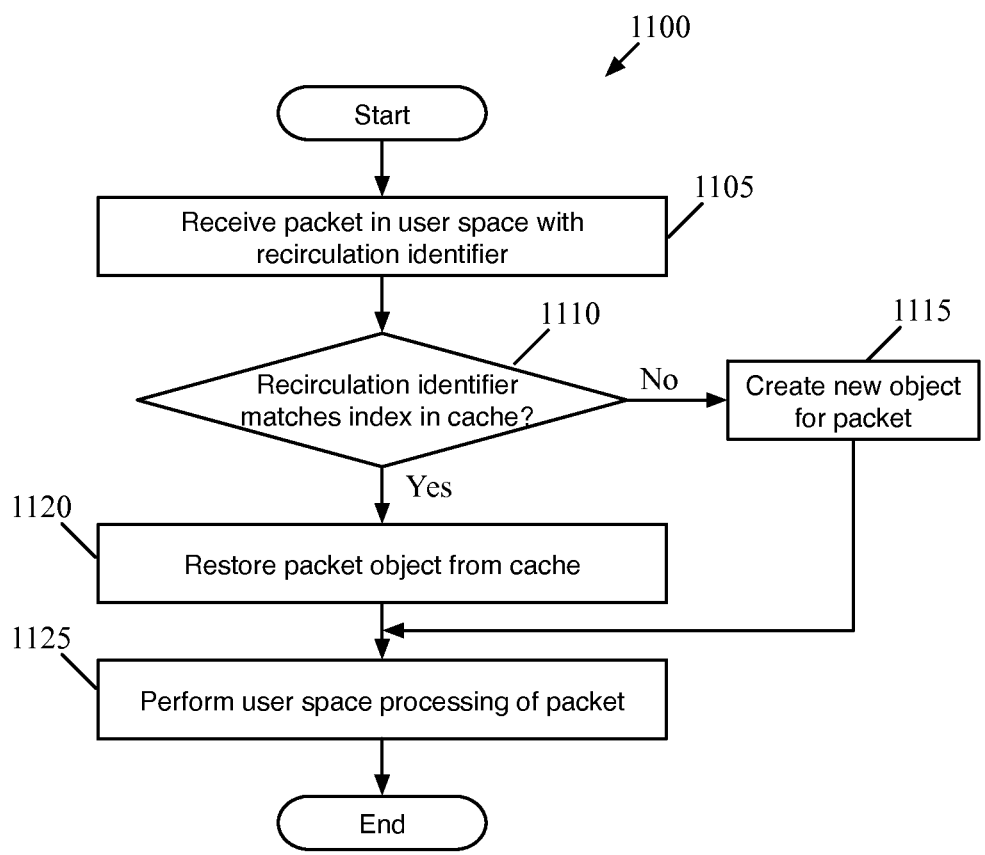
FIG. 11 conceptually illustrates a process of some embodiments for restoring the metadata and register fields for a packet object after recirculation (e.g., after a packet returns from the connection tracking module or is otherwise recirculated).

FIG. 11 conceptually illustrates a process 1100 of some embodiments for restoring the metadata and register fields for a packet object after recirculation (e.g., after a packet returns from the connection tracking module or is otherwise recirculated). The process 1100 is performed by the MFE daemon in some embodiments, when a packet with a recirculation identifier is pushed up to the user space after a kernel cache miss.

As shown, the process receives (at 1105) a packet in user space with a recirculation identifier. This recirculation identifier may be a default identifier for a new packet, or an identifier assigned by a recirculation action applied to the packet that resulted in its recirculation. In some embodiments, this process actually overlaps with the process 1000, in that the when a packet with a default recirculation identifier is received, no match is found in the subsequent operation and a new packet object is created. However, these processes are described separately in order to emphasize the treatment of the packet before and after recirculation.

The process 1100 then determines (at 1110) whether the recirculation identifier of the received packet matches an index in its packet object cache (e.g., the cache 905). In some embodiments, this is a single integer field, so no hash is required for the search. Other embodiments, however, do use a hash lookup to identify whether a match is found for the recirculation identifier in the packet object cache.

When no match is found (e.g., because the packet has a default recirculation identifier, the saved data was lost for some reason, etc.), the process creates (at 1115) a new object for the packet, as described above by reference to operation 1010 of FIG. 10. The process then performs (at 1125) user space processing for the packet, which as described by reference to FIG. 10 may result in recirculation of the packet.

On the other hand, when a match is found in the packet object cache, the process restores (at 1120) the packet object (e.g., the packet registers and/or metadata) from the cache, and then continues performing (at 1125) the user space processing of the packet. By retrieving this data from the cache, the MFE daemon does not have to re-perform the (computationally expensive) process of building up the existing metadata and register information. For instance, if the packet had already been processed through several logical forwarding elements before being recirculated, then these numerous stages will be skipped via the metadata and register restoration, as the stage register (that indicates the current packet processing stage of the packet) will be set back to its value at the time of the recirculation. That is, the MFE will not have to perform these same packet processing operations over again on the packet.

Figure 12:
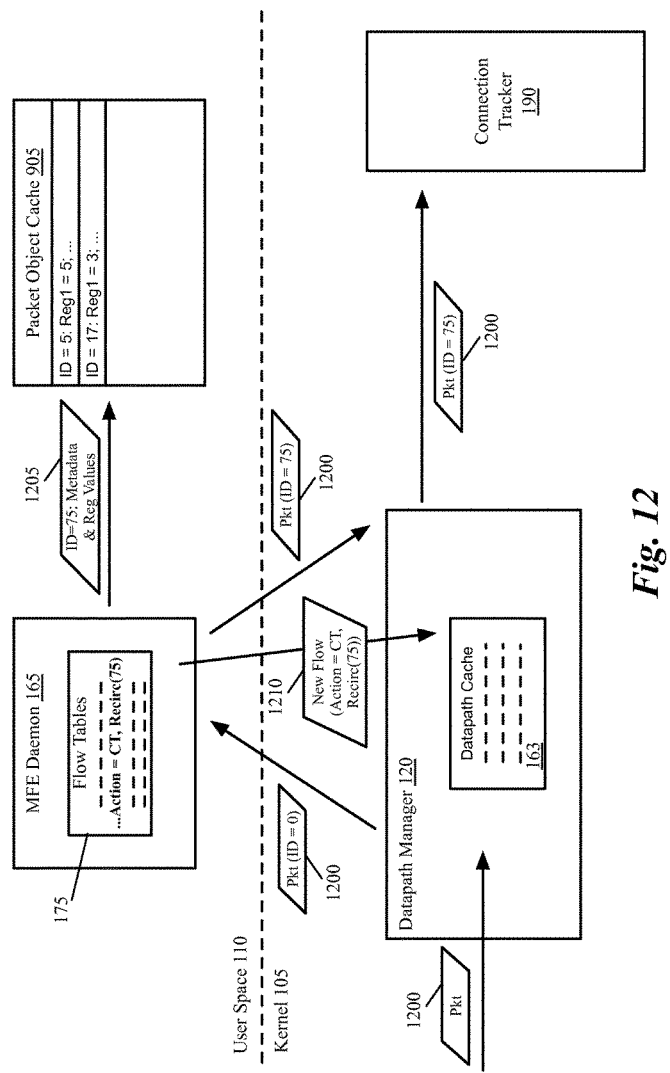
FIGS. 12 and 13 conceptually illustrate an example of a packet being processed by the MFE and then recirculated.
Figure 13:
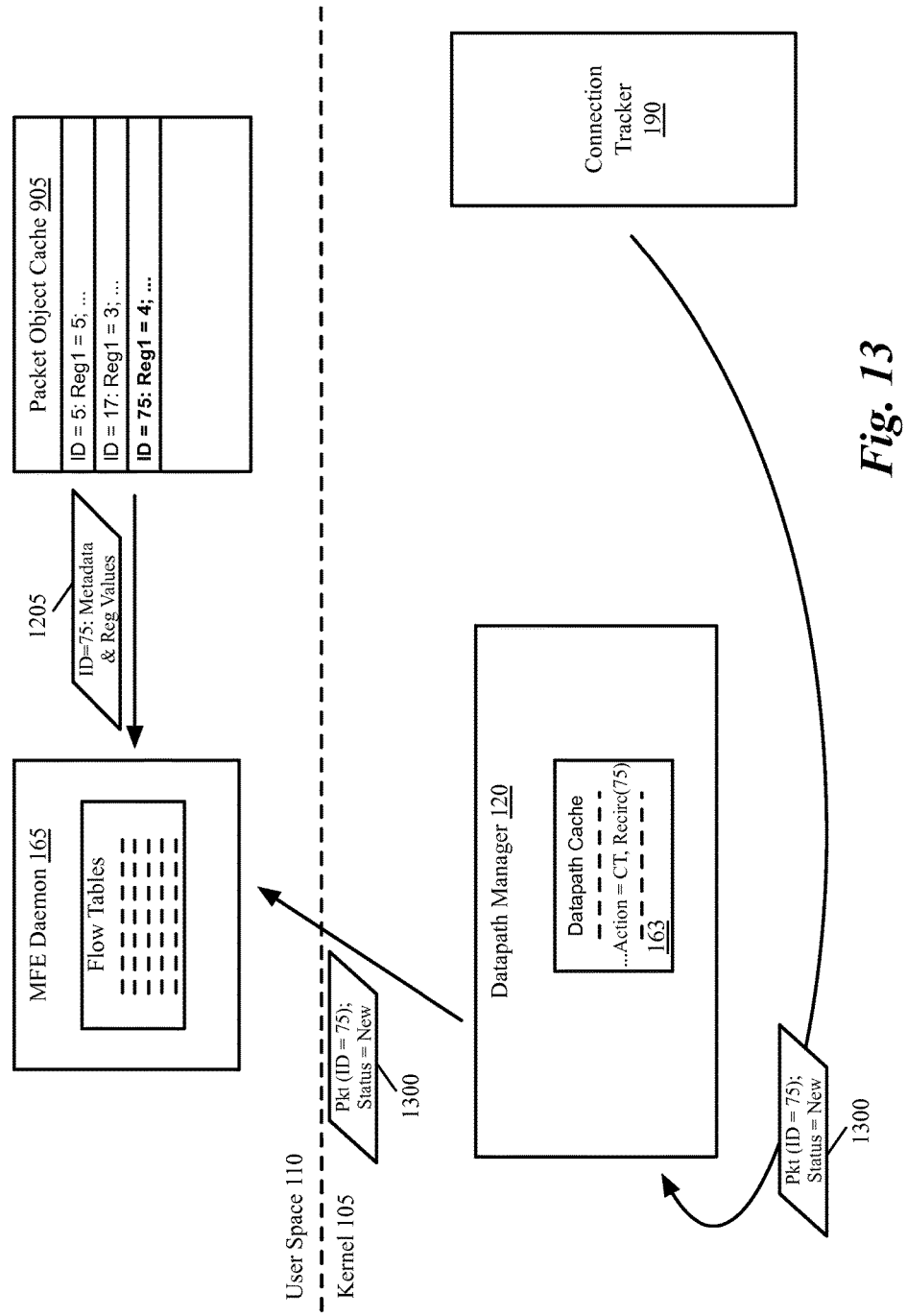

FIGS. 12 and 13 conceptually illustrate an example of a packet being processed by the MFE and then recirculated. Specifically, FIG. 12 shows a packet 1200 entering the MFE, not matching the kernel cache, being pushed up to the user space processing, matching an entry in the user space processing that specifies connection tracking and recirculation actions, and being sent to the connection tracker.

As shown, the packet 1200 enters the MFE in the kernel datapath manager 120, which includes (among other modules) a classifier that uses the datapath cache 163. The packet 1200 does not match any entries in the datapath cache 163 (e.g., because the packet is the first of a connection, or the first reply packet in a connection). As such, the MFE pushes the packet 1200 to the user space. Upon entry to the MFE processing in the datapath manager 120, the packet 1200 was assigned a default recirculation identifier of 0.

When the packet 1200 is pushed to the user space, the MFE daemon 165 instantiates a set of metadata and register fields for the packet (e.g., fields that are not actually part of the packet header, such as the ingress port, logical forwarding element and logical port identifiers, the current packet processing stage, etc.) and begins processing the packet through the flow tables 175. This processing may include several stages, at which point the bolded flow entry with an action of CT, Recirc (75) is matched. This action specifies to send the packet to the connection tracker and recirculate the packet, using a recirculation identifier of 75. As such, the MFE daemon 165 (i) stores the current metadata and register values 1205 for the packet 1200 in the packet object cache 905, sends the packet back to the kernel with the new recirculation identifier of 75, and (iii) installs a new flow entry 1210 in the datapath cache 163 based on the packet 1200 header values and the actions to take on the packet (which may include additional actions to modify packet header field values as well as the connection tracking and recirculation actions). The packet 1200 is then sent to the connection tracking module 190 for a check on its connection status.

FIG. 13 shows the packet returning from the connection tracker and being recirculated as a new packet 1300, again failing to match in the kernel cache, and being pushed up to user space process where the metadata and register values are restored. As shown, the packet 1300 enters the MFE in the kernel datapath manager 120. The packet 1300 has a recirculation identifier value of 75, and also has a connection status (new) as part of its data.

The datapath cache 163 now includes the new flow entry 1210 that was pushed down as a result of the processing of FIG. 12. However, neither this flow entry 1210 nor any of the other flow entries are matched by the packet 1300. The flow entry 1210 is not matched because both the recirculation identifier value and the connection status of the packet 1300 are different than the same fields for the original packet 1200.

Thus, the packet 1300 is pushed to the user space for processing. At this point, the MFE daemon 165 identifies the recirculation value (75) and searches the packet object cache 905 for this index. As shown, the packet object cache 905 now includes an entry indexed by the value 75, which stores the metadata and register field values for the packet 1200 at the time it was recirculated. Thus, the MFE daemon 165 restores this information 1205 for the packet, for use in subsequent packet processing. This subsequent packet processing would result in another new flow entry in the datapath cache 163 (and, depending on the outcome, possibly another recirculation action).

It should be noted that for subsequent packets, the user space processing and, therefore, the saving and restoration of metadata and register fields should not be necessary. In the connection tracking example, the second packet in a connection should match the first flow entry pushed to the kernel cache, which results in sending the packet to the connection tracker and recirculating the packet without the need for user space processing. This packet will return with a different connection status (established, presumably), which results in a cache miss and a return to user space. However, processing this second packet will result in a third kernel cache entry which should be the post-recirculation entry matched by the third and subsequent packets (after matching the same first entry prior to connection tracking and recirculation).

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
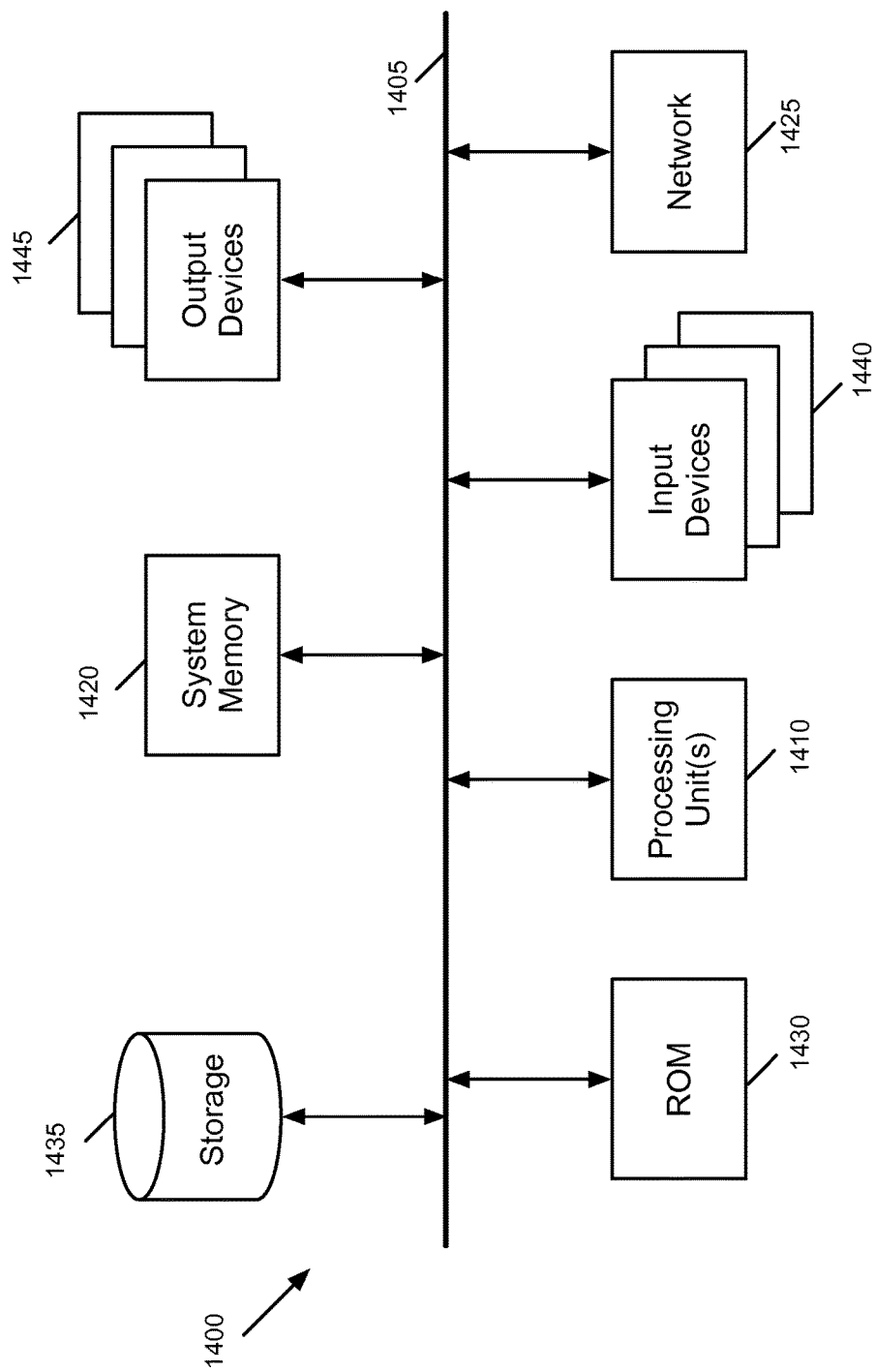
FIG. 14 conceptually illustrates an electronic system 1400 with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1420, a read-only memory (ROM) 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 8-10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

We claim:

1. A method for preserving temporary storage values of a packet processed by a managed forwarding element (MFE), the method comprising:
   while processing a packet at the MFE, determining that the packet does not match any cache entries of the MFE;
   sending the packet to a processing module of the MFE for processing the packet through a plurality of stages of tables;
   at the processing module, identifying that the packet is to be recirculated as a new packet for the MFE, wherein a set of packet field values used for processing the packet by the MFE are associated with the packet;
   storing the set of packet field values with an identifier value;
   recirculating the packet with the identifier value attached to the packet; and
   upon receiving the recirculated packet, using the identifier value to restore the set of packet field values for the recirculated packet.

2. The method of claim 1 further comprising, when the packet is initially received, assigning a default identifier value to the packet.

3. The method of claim 1, wherein the MFE is a flow-based MFE, the cache entries are flow entries in a kernel cache of the MFE, and the processing module is a user space processing module of the MFE.

4. The method of claim 1, wherein the set of packet field values comprises a set of values not part of the packet as received that are used during the plurality of stages of processing, the method further comprising, prior to the identifying:
   creating an initial set of packet field values for the packet; and
   while processing the packet through the plurality of stages of user space processing, modifying the set of packet field values for the packet.

5. The method of claim 4, wherein the stored set of packet field values for the packet comprises the initial set of packet field values as modified by the processing of the packet.

6. The method of claim 4, wherein recirculating the packet comprises again determining whether the packet matches any cache entries.

7. The method of claim 6 further comprising, after recirculating the packet:
   determining that the packet again does not match any cache entries of the MFE; and
   sending the packet again to the processing module of the MFE for processing through the stages of tables,
   wherein using the identifier value to restore the set of packet field values is performed after sending the packet again to the processing module.

8. The method of claim 1, wherein the set of packet field values comprises a plurality of metadata and register field values.

9. The method of claim 1 further comprising sending the packet to a connection tracking module that appends stateful information to the packet prior to recirculating the packet.

10. The method of claim 1 further comprising sending the packet for Multi-Protocol Label Switching (MPLS) processing prior to recirculating the packet.

11. A non-transitory machine readable medium storing a program which when executed by at least one processing unit implements a managed forwarding element (MFE), the program comprising sets of instructions for:
   while processing a packet at the MFE, determining that the packet does not match any cache entries of the MFE;
   sending the packet to a processing module of the MFE for processing the packet through a plurality of stages of tables;
   at the processing module, identifying that the packet is to be recirculated as a new packet for the MFE, wherein a set of packet field values used for processing the packet by the MFE are associated with the packet;
   storing the set of packet field values with an identifier value;
   recirculating the packet with the identifier value attached to the packet; and
   upon receiving the recirculated packet, using the identifier value to restore the set of packet field values for the recirculated packet.

12. The non-transitory machine readable medium of claim 11, wherein the program further comprises a set of instructions for assigning a default identifier value to the packet when the packet is initially received.

13. The non-transitory machine readable medium of claim 11, wherein the MFE is a flow-based MFE, the cache entries are flow entries in a kernel cache of the MFE, and the processing module is a user space processing module of the MFE.

14. The non-transitory machine readable medium of claim 11, wherein the set of packet field values comprises a set of values not part of the packet as received that are used during the plurality of stages of processing, the program further comprising sets of instructions for, prior to the execution of the set of instructions for identifying:
   creating an initial set of packet field values for the packet; and
   while processing the packet through the plurality of stages of user space processing, modifying the set of packet field values for the packet.

15. The non-transitory machine readable medium of claim 14, wherein the stored set of packet field values for the packet comprises the initial set of packet field values as modified by the processing of the packet.

16. The non-transitory machine readable medium of claim 14, wherein the set of instructions for recirculating the packet comprises a set of instructions for again determining whether the packet matches any cache entries.

17. The non-transitory machine readable medium of claim 16, wherein the program further comprises sets of instructions for, after recirculating the packet:
- determining that the packet again does not match any cache entries of the MFE; and
- sending the packet again to the processing module of the MFE for processing through the stages of tables,
- wherein the set of instructions for using the identifier value to restore the set of packet field values is performed after the set of instructions for sending the packet again to the processing module.

18. The non-transitory machine readable medium of claim 11, wherein the set of packet field values comprises a plurality of metadata and register field values.

19. The non-transitory machine readable medium of claim 11, wherein the program further comprises a set of instructions for sending the packet to a connection tracking module that appends stateful information to the packet prior to recirculating the packet.

20. The non-transitory machine readable medium of claim 11, wherein the program further comprises a set of instructions for sending the packet for Multi-Protocol Label Switching (MPLS) processing prior to recirculating the packet.

* * * * *